Sept. 27, 1932.   R. R. HARMON   1,880,017
APPARATUS FOR REMOVING SUSPENDED PARTICLES FROM GASES AND VAPORS
Filed Sept. 7, 1929   2 Sheets-Sheet 1

INVENTOR.
Robert R. Harmon
By
Charles B. Mann Jr.
ATTORNEY.

Sept. 27, 1932.  R. R. HARMON  1,880,017
APPARATUS FOR REMOVING SUSPENDED PARTICLES FROM GASES AND VAPORS
Filed Sept. 7, 1929   2 Sheets-Sheet 2

INVENTOR.
Robert R. Harmon
BY
Charles B. Mann Jr,
ATTORNEY.

Patented Sept. 27, 1932

1,880,017

UNITED STATES PATENT OFFICE

ROBERT R. HARMON, OF CHARLOTTESVILLE, VIRGINIA, ASSIGNOR TO PEABODY ENGINEERING CORPORATION, OF NEW YORK, N. Y., A CORPORATION OF NEW YORK

APPARATUS FOR REMOVING SUSPENDED PARTICLES FROM GASES AND VAPORS

Application filed September 7, 1929. Serial No. 390,901.

My invention relates to the art of removing suspended particles of solids and liquids from bodies of gases and vapors, and likewise, of humidifying such bodies, employing the original heat of the latter together with other means for this purpose.

In the cleaning of industrial gases such as those issuing from blast furnaces, various kinds of kilns, smoke stacks and similar sources, I have discovered that it is possible to free the gases of suspended solids to a far greater degree by the proper control of the condensation phenomenon than by any other means within my knowledge, and the principal object of the present invention is to provide improved means of conditioning the gases by reducing the number of particles in suspension in the raw gases to a minimum, and of adequately and economically humidifying the latter at the same time, prior to the final and ultimate cleaning by an improved condensation process, which latter forms the subject of a companion application for patent filed by me on even date herewith.

Aside from the importance of conserving the thermal energy of the gas to effect the maximum humidification possible by evaporation of water, and of completely stripping the gas of all but the finest particles, prior to condensing the vapor, due consideration has been given by me to the practicability of economically attaining these objectives by consistent and continual performance of the apparatus and process, under operating conditions.

A serious obstacle to be overcome in all wet-cleaning methods of stripping hot, dust and fume laden gases, is that of removing the great preponderance of material which the gas originally carries in suspension, without continued deposition of the partially wetted dust in the apparatus, which continuous deposition causes stopping of the gas flow and impairment of the cleaning efficiency.

In blast furnace practice particularly, gas surges are of frequent occurrence, and when they take place, vast amounts of dust are carried into the apparatus. This dust contains substances which cause it to adhere tenaciously to any objects which are in the path of the gas.

I have also observed that suspended solids are readily deposited by gaseous bodies if the latter experience eddy currents, produced as by the presence of rigid baffles and similar obstructions in the gas stream, which cause the gas to flow in tortuous paths. The deposits of partially wetted dust, grow rapidly and into enormous proportions and necessitate frequent shut-downs of the apparatus in order that the deposits may be removed. This is a costly but very common procedure.

By means of my invention, I obviate such difficulties as outlined above and insure the proper conditioning of the raw gas, i. e. secure the maximum humidification of the gas and reduce the number of suspended particles to a minimum, prior to the final cleaning, in a most effective and economical manner.

With the above, and other objects in view, the invention is illustrated in the accompanying drawings, wherein,—

Figure 1:
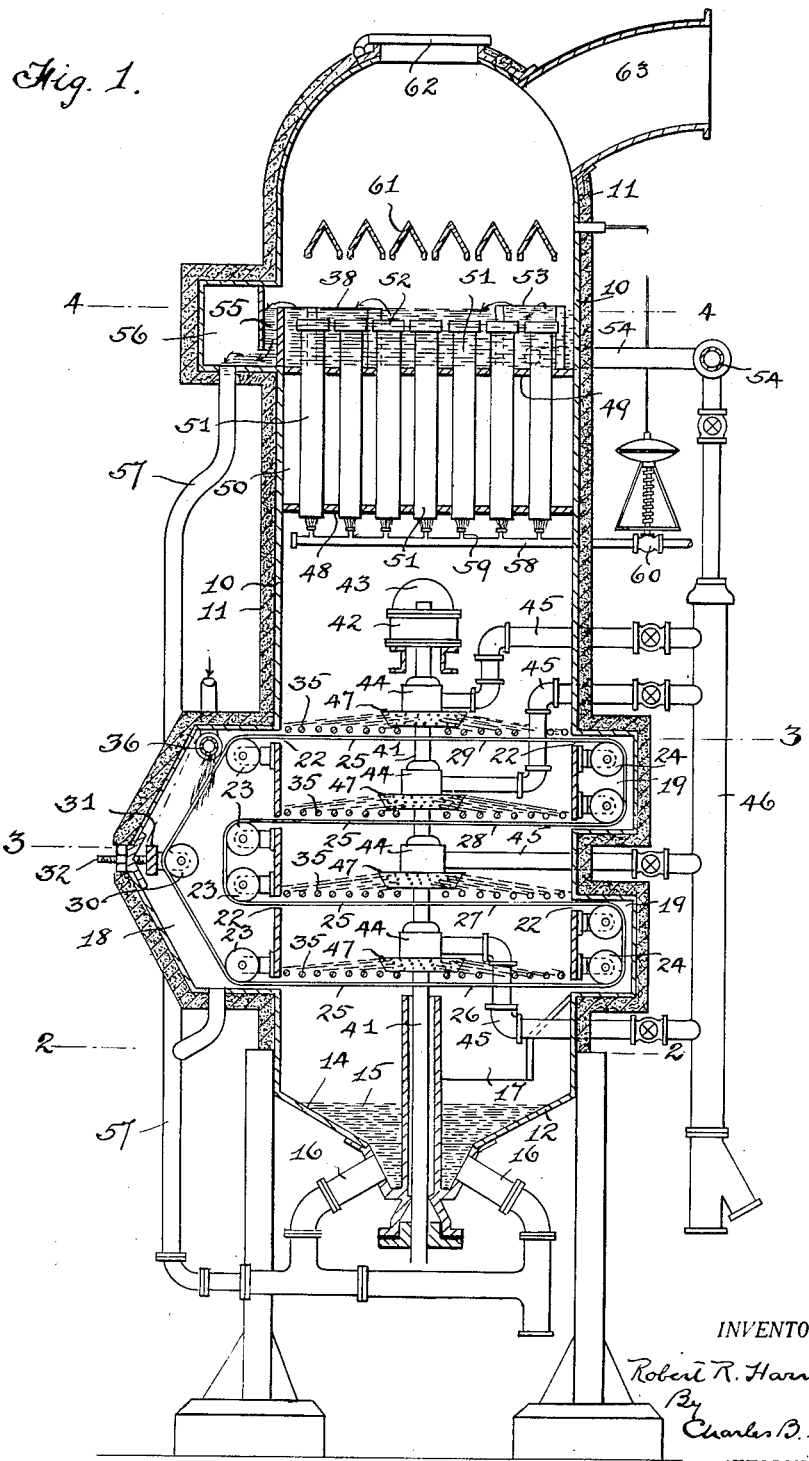
Fig. 1 shows the improved apparatus in vertical section.

In the drawings, the numeral 10 designates a vertical shell of the conventional tower form which is provided with an external covering of insulation 11, for the purpose of retaining as much of the original heat of the gas as possible, during its passage through the shell.

At the base 12, the shell is circular in cross-section and is preferably provided with a tangential passage 13, through which the gas is introduced to the interior.

Beneath the tangential passage, the base 12 has a basin-like bottom 14 in which a body of water 15, is maintained at a constant level and from which pipes 16, lead for the purpose of carrying off the water so that a continuous circulation of water to and from the basin may be maintained.

A depending semi-cylindric baffle 17 extends around the shell-base over the basin to direct the incoming gas from the tangential passage 13 around the circular wall of the shell before it begins its upward flow through the latter.

Figure 3:
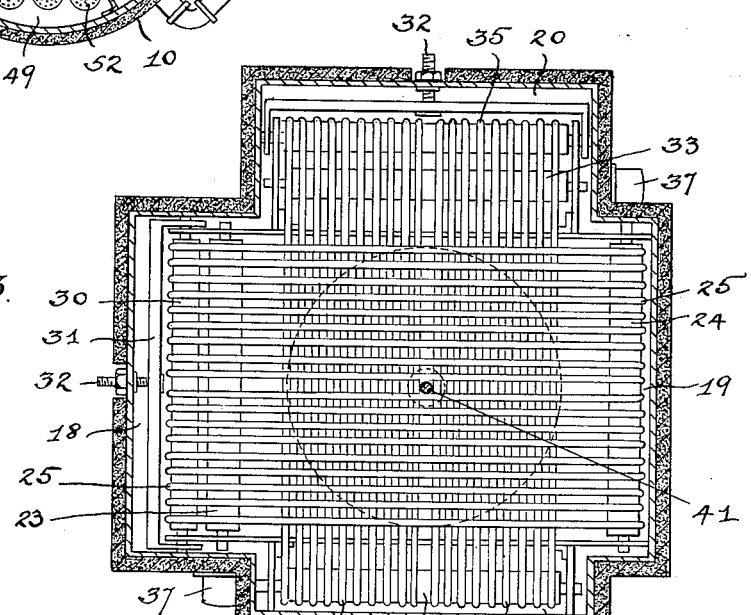
Fig. 3 shows another cross-sectional detail through the apparatus,—the section being taken on the line 3—3 of Fig. 1.
Figure 2:
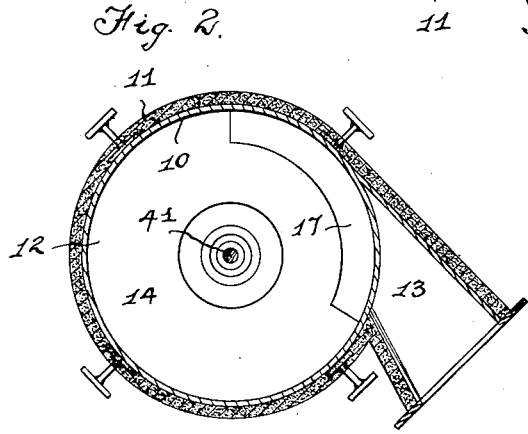
Fig. 2 illustrates a cross-sectional detail through the same as viewed on the line 2—2 of Fig. 1.
Figure 5:
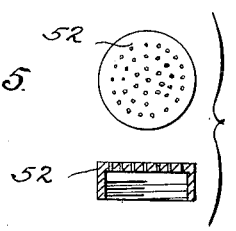
Fig. 5 shows a top and sectional view respectively of one of the detached tube-caps.

Just above the tangential passage 13, I provide horizontally-extending, and in this instance, substantially rectangular offset recesses 18, 19, 20 and 21, respectively, as clearly shown in Fig. 3. These recesses are preferably located exterior of the shell proper, and suitable horizontal openings 22 are provided in the wall of the shell from the interior of the latter to the said off-set recesses for a purpose which will presently be explained.

By reference to Fig. 3, it will be noted that the recesses 18 and 19 are located at two diametrically-opposite sides of the shell while the recesses 20 and 21 are disposed at right angles to the other recesses and are also located at two diametrically-opposite sides of the shell.

In the recess 18, I locate a plurality of horizontal rollers 23 in different horizontal planes but in vertical alinement, while in the recess 19 there are a plurality of horizontal rollers 24 also in different horizontal planes but in vertical alinement.

The peripheries of these rollers 23 and 24 are arranged so as to aline with the horizontal openings 22 through the shell, as shown in Fig. 1 of the drawings, and a screen baffle formed, in this instance of endless wire strands 25, is fed around the rollers 23 and 24, and passes back and forth across the interior of the shell. The arrangement of rollers and wire is such as to provide a plurality of baffles formed by the stretches of the screen in different horizontal planes across the interior of the shell, as indicated at 26, 27, 28 and 29 in Fig. 1.

A tension roller 30, is also provided in the recess 18, which tension roller, in this instance is carried by a yoke-frame 31 and an adjusting means 32, is connected to the yoke-frame whereby the tension of the wires may be varied at will.

To increase the effectiveness of the screen baffles, I preferably provide another series of rollers 33 in the recess 20 and also another series of rollers 34 in the recess 21, so that a second series of screen wires 35 may be passed around the rollers 33 and 34 and across the shell in a direction at right angles to the wires 25 so as to form a mesh by the crossing of the two sets of wires 25 and 35.

By reference to Fig. 1, it will be noted that the two series of screen wires 25 and 35 cross each other in the shell and by preference are in contact so that they form a baffle mesh through which the up-flowing gas passes.

From practical experience with blast furnace gas-cleaning apparatus, I have learned that vast amounts of dust are carried into the apparatus during the frequent gas surges and this dust contains substances which cause it to adhere to any surfaces or objects which are in the path of the gas-stream and that the continuous deposition of this dust necessitates frequent shut-downs of the apparatus in order that such deposits may be removed.

I have therefore arranged the two series of screen wires 25 and 35 about the rollers 23, 24 and 33 and 34 so that both sets may have movement through the rotation of the rolls, and the screen wires therefore travel horizontally across the interior of the shell and the gas must pass through the plural stretches of moving screens.

I also provide means, such as a nozzle 36 in the recesses 18 and 20 and exterior to the shell chamber from which hot water may be sprayed over the screen wires to clean the same and thus prevent continuous deposition and building up of dust particles on the wires.

The rolls may be driven by motors 37 to impart a slow advancing motion to the screen wires.

A vertical shaft 41 extends up through the basin 14, and also through the several stretches 26, 27, 28, and 29 of the screen wires. This shaft has support in a bearing 42 arranged in a cross-wise tunnel 43 through the shell and is driven by any suitable means.

On the shaft 41, I provide a plurality of hot water distributors 44,—one directly over each stretch of moving screen wires and each distributor is connected by a water-supply pipe 45, which pipes lead from a vertical manifold 46 and enter shell 10.

The shaft 41 also carries a plurality of inverted conical spraying receptacles 47 into which the hot water is fed from the distributor 44, and is then thrown laterally in a series of sprays by centrifugal force and distributed in a film over the crossed screen wires so that the up-flowing gas must pass through the water film carried by the meshed or crossed wires and in this way remove the greater portions of the dust particles which wash down and finally deposit in the basin 14, from which they are drained off by pipes 16 and delivered to a clarifier.

Above the uppermost stretch 29 of screen wires and the spraying receptacle 47 thereover, I provide a horizontal diaphragm or partition 48 across the interior of the shell. This diaphragm has a tight fit or joint with the shell-wall.

Above the diaphragm 48, and spaced from the latter is a second diaphragm 49 which forms a dead space 50 in the shell between the two diaphragms.

A series of vertical tubes 51 extend down through the upper diaphragm 49; through the dead space 50 and have their lower ends projecting through and below the lower diaphragm 48. The upper ends of these tubes project above the upper diaphragm 49 and each of said upper tube-ends has a perforated cap 52 thereon, while the lower ends of said tubes are wide open into the shell beneath the lower diaphragm 48.

Figure 4:
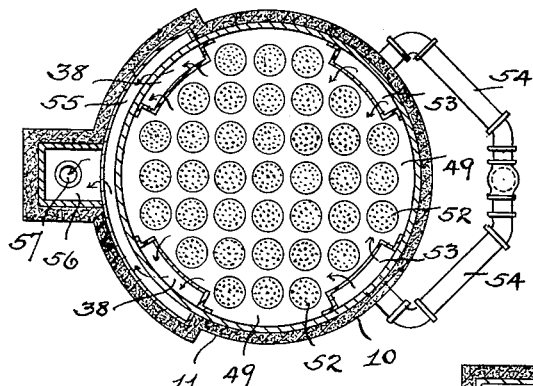
Fig. 4 illustrates another cross-sectional detail through the apparatus,—the section being taken on the line 4—4 of Fig. 1.

By reference to Figs. 1 and 4 of the drawings, it will be noted that on top of the upper diaphragm 49 and against the circular shell-wall 10, there are a plurality of vertical chambers 53 and that hot water supply pipes 54 from the manifold 46, enter these chambers through the side of the shell and supply hot water thereto.

The chambers 53 extend vertically to a point slightly above the horizontal top or capped ends of the tubes and water overflows from the chambers into the space on top of the upper diaphragm 49.

The chambers 53 through which water is supplied are preferably arranged at one side of the shell because at the opposite side thereof I arrange similar chambers 38 whose walls have their upper edges also above the capped end of the tubes, which chambers 38, serve as overflows and maintain a constant water level above the diaphragm and over the capped ends of the tubes.

The overflow chambers 38 have their lower ends in communication with a segmental overflow passage 55, which extends part way around one side of the shell and this passage 55, communicates with an outlet 56 from which a pipe 57, leads and conveys the overflow water back to the clarifier.

It will, of course, be obvious that while the capped and perforated ends of the tubes 52 are constantly submerged in the moving body of hot water, the latter will not flow down through those tubes because the gas is passing out and up through said perforations and through the stream of water over the caps.

Beneath the lower open ends of the tubes there are a series of pipes 58, each with a plurality of nozzles 59 and these nozzles are located directly beneath the open tube-ends so that steam may be conveyed through said pipes and nozzles and directed upwardly into each of the tubes.

The steam passing through these pipes and nozzle is controlled by a thermostatic valve 60, which latter is governed automatically by the temperature of the gas passing into the lower ends of the tubes.

A plurality of baffles 61 are arranged above the tube-ends to retain suspended water particles which the gas might carry.

A clean-out door 62 is provided at the top of the shell and an outlet pipe 63 for the preliminarily-cleaned gas is also located at the top of said shell.

The operation of the apparatus is as follows:

Hot, dust or fume laden gases enter the base of the shell through the tangential passage 13, flowing between the shell 10 and the semi-cylindric baffle 17, and then under this baffle and upwardly. In the continuous upward passage of the gas, it encounters the plural stretches of meshed screen baffles formed by the two sets of wires 25 and 35.

These stretches of wires are preferably in slight contact and move slowly in directions at right angles to each other. This slow but definite motion is imparted to the wires in order that solids, which are removed from the gas, cannot adhere to their surfaces for a prolonged period and thereby become the nuclei for obnoxious deposits for in case any deposition of solids does occur, they will be removed a little later as these wires pass through the spray of hot water from nozzles 36 in the recesses 18 and 20.

As the gas passes through the openings between the crossed wires 25 and 35 which form a sort of screen, hot water is distributed by the rotating distributors 47 into the gas stream and over the entire screen area. The mesh of this so called screen, is preferably such that the surface tension of the liquid thus distributed, will cause a film of liquid to be retained on the screen and to fill the openings between the strands. This force of adhesion due to the surface tension of the liquid, together with the velocity-component of the gas in its upward passage through the openings, will insure a measurable depth of water being retained on the moving screen, and the resulting bubbling action is a most effective means of stripping the gas of its suspended particles.

The hot water thus distributed finally drips through the upper stretch of screen due to the increasing depth of the body of water held thereon, and thence onto the the stretch of screen below, thus progressing ultimately to the basin on the bottom of the shell. From the basin, the hot dirty water is carried by pipes to a clarifier and finally returns by suitable pumping means, after clarification, to the manifold 46 for redistribution and recirculation.

Thus by recirculation of the heated water, no heat is lost and maximum evaporation of the water, with maximum humidification of the gas is accomplished. To further humidify the gas, as demanded by certain conditions, means are available for injecting steam into the gas in a series of streams to accomplish the most rapid and uniform mixing of the vapor and gas. The quantity injected is controlled by the thermostatically activated valve 60, which is controlled by the temperature of the gas in the shell above the diaphragm 49.

To further enhance the mixing and diffusing of the injected vapor with the gas, the gas-vapor mixture is caused to bubble through hot water as it passes from the perforated tube caps 52. A small quantity of water for this purpose is drawn from the manifold 46 as previously explained, flowing across diaphragm 49 and finally out to the discharge line 57.

The stripped, humidified gas flows out of the apparatus through nozzle 62 leaving the larger entrained water droplets deposited on the baffles 61.

From the foregoing explanation, it will be noted that the present apparatus embodies desirable and novel features and operations, particularly as follows:

First, by causing the gas to flow in as nearly stream line motion as possible, avoiding tortuous passages and abrupt, sharp turns, with a consequent reduction in the number of eddy currents, and thereby precluding the deposition of material which could serve to interrupt the cleaning process or impair the efficiency of the apparatus;

Second, by causing the number of suspended particles in the gas to be reduced to a minimum by passing the gas through a blanket of water held on a moving screen, the latter being composed of independent strands or members, each of which is in continual and uniform motion:

Third, by uniformly distributing preheated liquid over such a screen, to secure contact with the gas and to continually flush the screen and walls of the apparatus to effectively remove the material given up by the gas which might collect thereon:

Fourth, by making all parts of the apparatus exposed to the raw gas accessible to the distributed liquid, to insure their being deluged at all times;

Fifth, by cleaning the gas at a temperature above its dew point, thereby preventing the chilling of the gas and partial wetting of the suspended material therein, with attendant deposition in the approaches to the apparatus; and Sixth, by providing a means of augmenting or supplementing the original vapor content to continue the humidification of the gas to any desired degree as by the injection of steam.

Having described my invention, I claim:

1. An apparatus for cleaning gas having a chamber through which the gas to be cleaned flows, a series of endless wires extending across the chamber and across the path of the gas stream, another series of wires also extending across the chamber and the gas stream in a direction to cross the first named series of wires and form a mesh, means for moving the wires to cause them to travel, and means for directing water over the crossed wires.

2. An apparatus for cleaning gas having a chamber through which the gas to be cleaned flows, two series of wires extending across the chamber and also across the path of the gas stream,—one series of wires extending in a direction at right angles to the wires of the other series to form a series of openings through which the gas may pass and means for cleaning said wires.

3. An apparatus for cleaning gas having a vertical shell with a vertical chamber through which the gas to be cleaned flows, means for directing sprays of water in different horizontal planes across the vertical chamber and the path of the up-flowing gas stream, means entering the chamber through the shell-wall and movable crosswise of said chamber and the gas stream between the several sprays of water and having openings therethrough through which the gas passes, and means exterior to the shell for cleaning said latter movable means.

4. An apparatus for cleaning gas having a vertical shell with a vertical chamber through which the gas to be cleaned flows, a plurality of centrifugal means one in advance of another in said vertical chamber for directing sprays of water across the gas stream and means movable through the shell wall and across the chamber between adjacent water spraying means for carrying films of water across the chamber and the gas stream.

5. An apparatus for cleaning gas having a vertical shell with an interior vertical chamber up through which the gas to be cleaned flows, a plurality of centrifugal water-spraying means in said vertical chamber,—one above another for centrifugally spraying water across the vertical chamber of the shell, baffles movably sustained and extending through the shell-wall and across the vertical chamber in the path of the up-flowing gas-stream said baffles being arranged to receive water from the centrifugal spraying means and means exterior to the said chamber for cleaning the baffles.

In testimony whereof I affix my signature.

ROBERT R. HARMON.